Feb. 15, 1927.　　　　　　　　　　　　　　　　　1,617,389
J. A. HARRISON ET AL
EDUCATIONAL GAME
Filed Feb. 26, 1923　　　　5 Sheets-Sheet 1

Inventors.
John A. Harrison
Garvin R. Wylie

Feb. 15, 1927.
J. A. HARRISON ET AL
1,617,389
EDUCATIONAL GAME
Filed Feb. 26, 1923    5 Sheets-Sheet 2
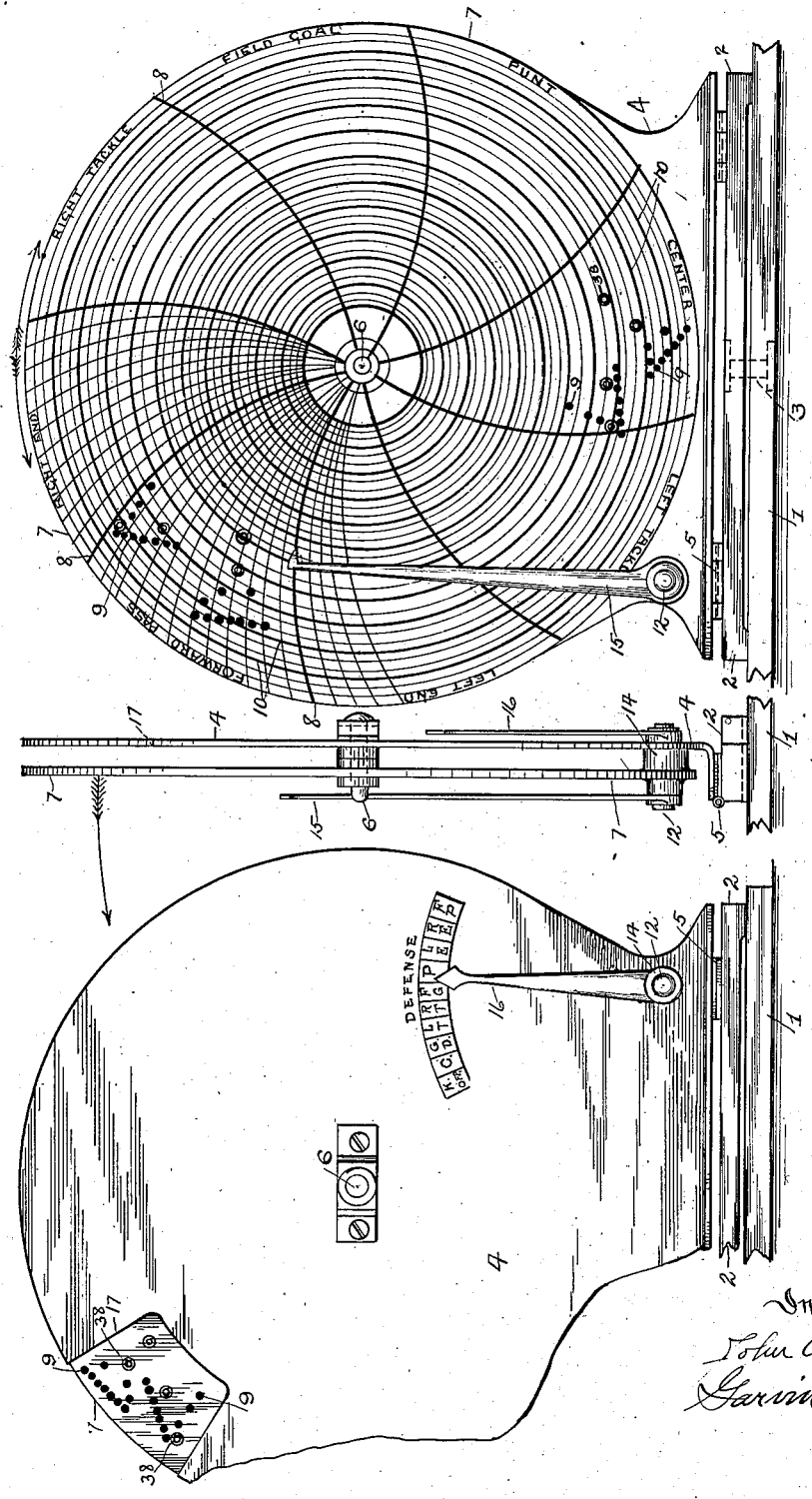

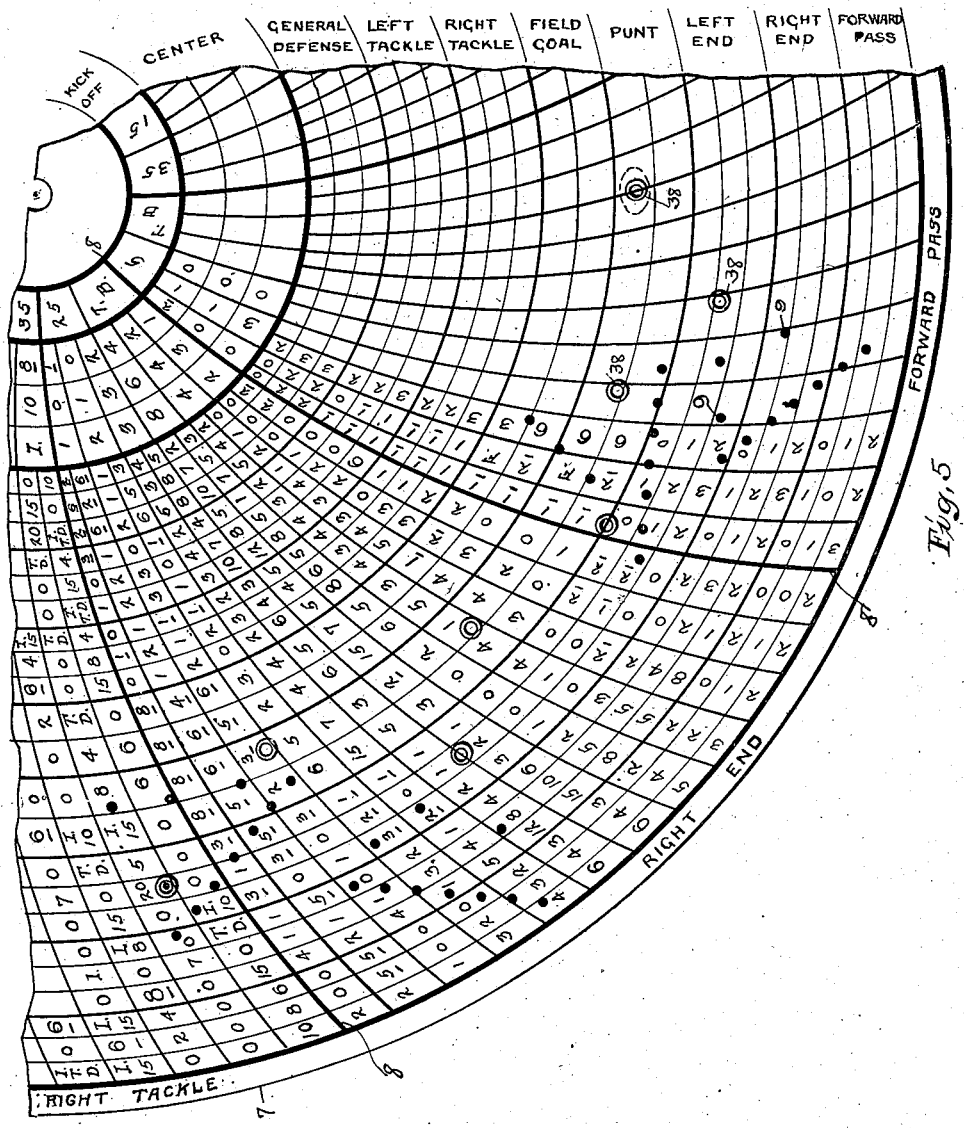
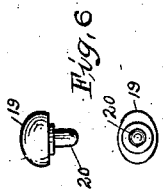

Feb. 15, 1927.
J. A. HARRISON ET AL
1,617,389
EDUCATIONAL GAME
Filed Feb. 26, 1923   5 Sheets-Sheet 4
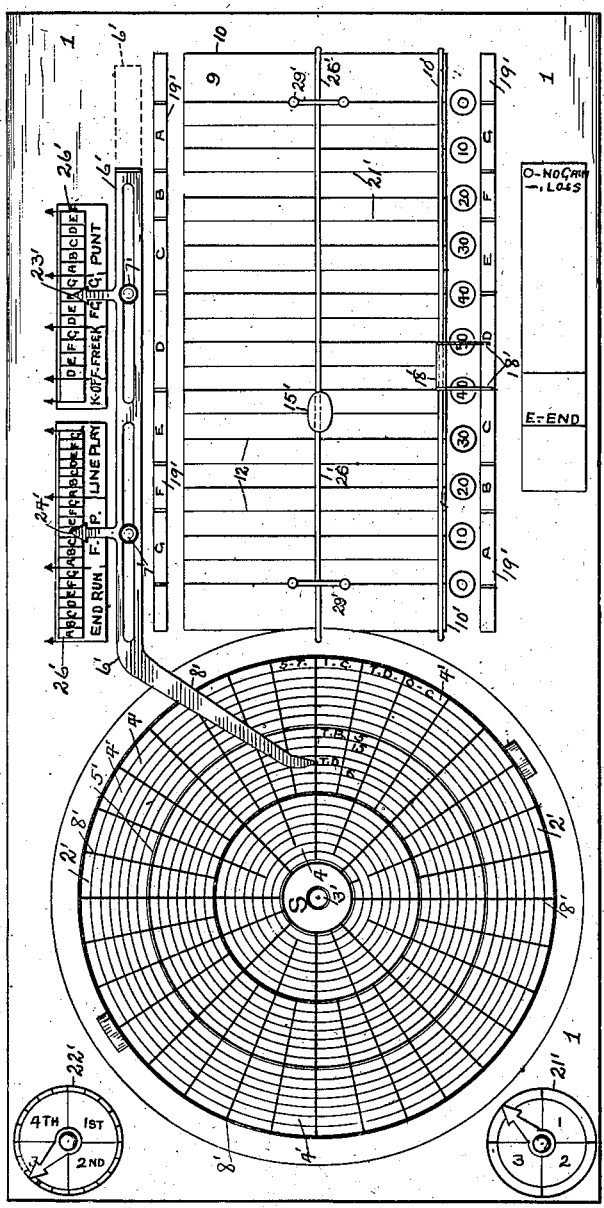
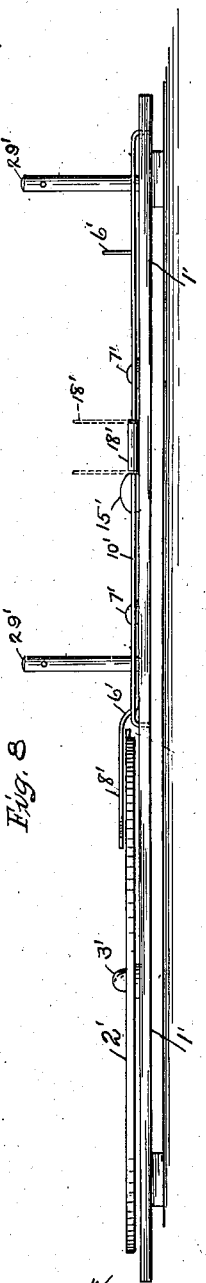
Inventors.
John A. Harrison
Garwin R. Wylie

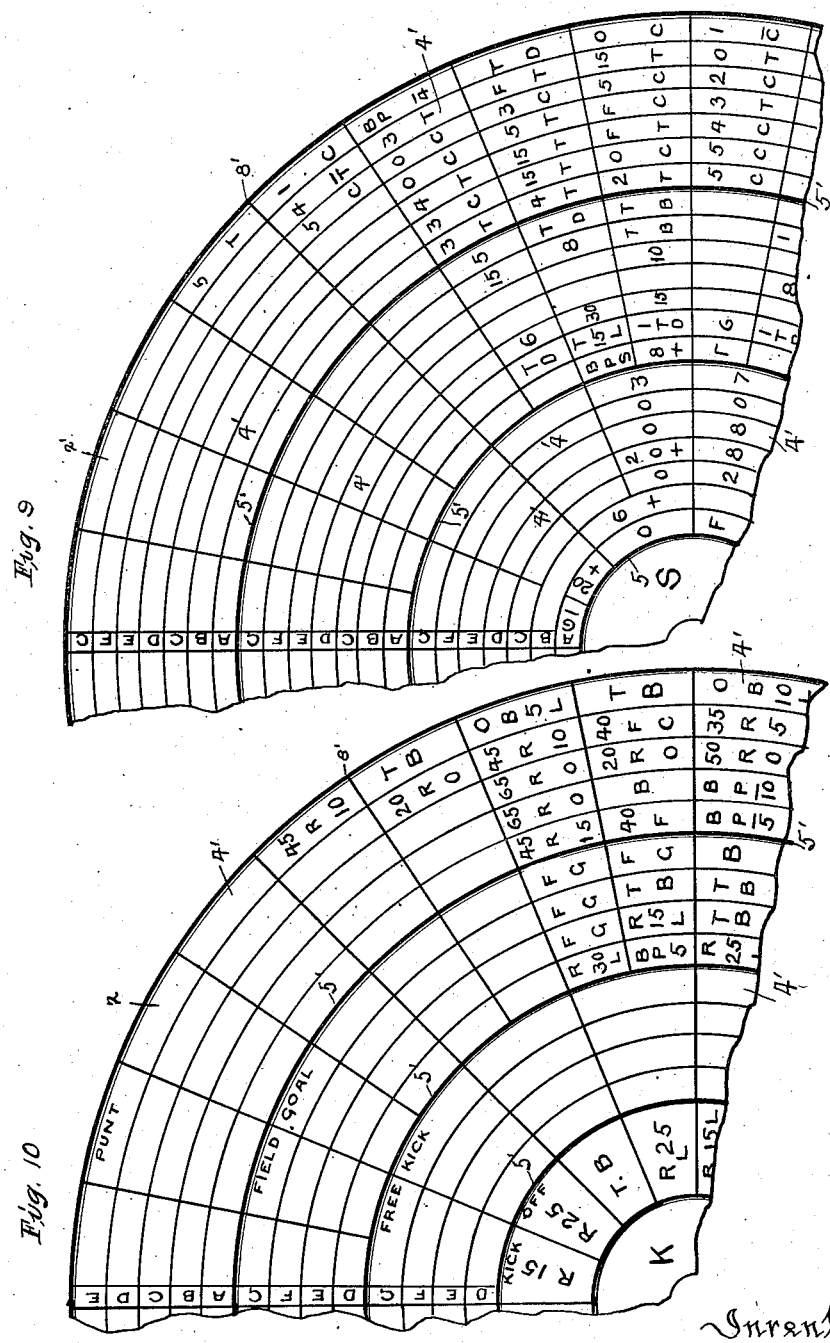

Patented Feb. 15, 1927.

1,617,389

UNITED STATES PATENT OFFICE.

JOHN A. HARRISON, OF PARNASSUS, AND GARVIN R. WYLIE, OF WASHINGTON, PENNSYLVANIA.

EDUCATIONAL GAME.

Application filed February 26, 1923. Serial No. 621,201.

This invention relates to an improved educational apparatus and parlor game. The object is to provide an apparatus by means of which instruction may be given in the art of football and by the use of the same apparatus the game may be played in accordance with the official football rules now adopted by the proper authorities.

The invention comprises a table or board having a printed illustration of a football field in accordance with the rules of the game, with a ball adapted to be moved in the direction of the length and breadth of said field; a rotating disk located adjacent to said field, an indicator or pointer operated in connection with said disk; a series of concentric circles and radial lines forming rectangular divisions printed on one or both sides of said disk, and a series of letters and symbols printed within said concentric circles representing specific plays along with diagrams of players' positions, together with numerous other features that make up a device upon which a complete game of modern football may be played, as will be fully described hereinafter.

The popular game of football as now played by our high schools and colleges is governed by a set of rules and these are official. It is the purpose of this invention to provide an apparatus that will permit a game of football to be played by two persons, the game being governed by said "official rules." The winner of the game must depend largely upon the skill and knowledge of football that he possesses and as in the actual game to some extent upon chance.

Provision is made for any and all of the various plays that occur in the actual game of football, together with means of keeping record of the number of downs, distance to be gained, playing time, and scoring.

In the drawings we have shown two games, one of which depends entirely upon the skill of the players, and the other largely upon chance. The former provides a game in which experts and others may use their skill and knowledge to win and to develop different plays, the latter used to illustrate and familiarize the player with various formations and plays adapted to certain portions or parts of the playing field.

In the accompanying drawings:

Figure 2 is a side elevation of the offensive side of the disk.

Figure 3 is an elevation of the reverse side of the disk, partly broken away.

Figure 4 is an edge view of the disk and its supporting frame and a portion of the base.

Figure 5 is an enlarged plan view of a segment of the rotating disk, having indicated thereon a few of the combined figures, letters, symbols and diagrams, each set representing one complete play.

Figure 6 is a side elevation and inverted plan view of the football used with the disk.

Figure 7 is a plan view of a modification of our improved game, by means of which beginners may more quickly acquire a knowledge of the various plays and rules of the game.

Figure 8 is a side elevation of the same.

Figure 9 is an enlarged plan view of a segment of the rotating disk used with this modified form of the invention, having indicated thereon a few of the combinations of letters, figures, and symbols, each set representing one complete play.

Figure 10 is a similar view showing the reverse side of the said disk, having printed thereon similar combination plays.

Figure 1:
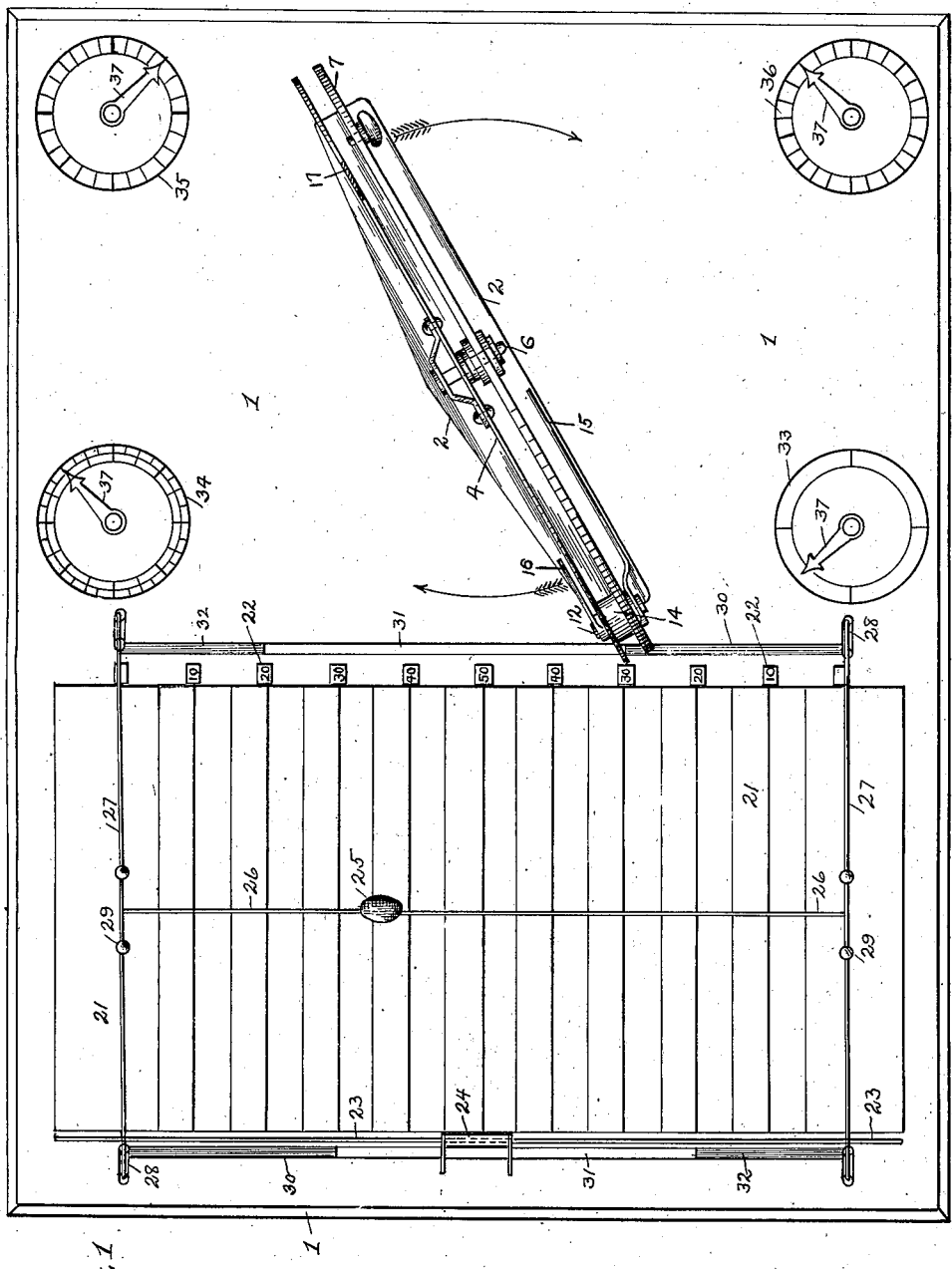
Figure 1 is a plan view of our improved football game, showing the arrangement of parts and location of the same.

To put our invention into practical form, we first provide a smooth, flat board or table 1, preferably rectangular in form and of light weight in order that the same may be easily handled and in no way cumbersome. See Figures 1 to 6 inclusive.

Arranged at a suitable position upon this board 1, is pivoted a base bar 2, capable of being moved about its pivoted point 3, in a horizontal direction as indicated by the arrows, (see Fig. 1), said base bar having hinged thereto a back piece 4, the hinges 5 of which will permit the same to assume a vertical (as shown) or horizontal position, the latter when not in use to reduce the bulk of the apparatus. Rigidly attached to this back piece 4, and at a central location thereon is an outwardly projecting pin 6, designed to carry and support a disk 7, capable of being rotated freely about said pin. Illustrated upon one face of this disk 7, (Figs. 2 to 5) is a series of heavy radial lines 8, dividing said disk into eight compartments, and each compartment designated by a name (see Fig. 2) such as "Forward pass," "Left end", "Punt", etc. This disk 7, is further divided by heavy concentric lines 10, into divisions of defense and said divisions subdivided by concentric circles, some by three and others by two. The radial compartments are also subdivided by means of radial curved lines, thereby forming a multiplicity of separate small compartments, each of which contains a capital letter, a figure, a minus sign, or a combination of the same, and each set representing a specific play upon the playing field, as will be fully described hereinafter.

Within each of these compartments, and located within the heavy radial lines are printed two series of small circles or dots 9, each series representing positions of the players of the offensive team and in addition are perforations 38, which extend through the said disk and are represented on the drawings by double circles.

At the lower left hand corner of the vertical back piece 4, is arranged a short horizontal shaft 12, mounted in a bearing 14, and having attached thereto two pointers 15, and 16. The one 15, adapted to be moved in a radial line across the printed face of the disk 7, from the outer perimeter to the center of the same, and the other 16, located at the rear of the frame 4, adapted to be moved in unison with the pointer at the front. The two pointers 15, and 16, designate the defense used 16, and the result of the play 15. At the upper left hand portion of the frame 4, is an opening 17, through which a portion of the back of the disk 7, may be seen (see Fig. 3). A reproduction of the position of the players in each compartment is printed on the back of the disk, 7, together with the aforementioned perforations 38, clearly distinguished.

A small pin is provided, said pin comprising a heavy head or body portion 19, and short integral shank 20 (see Fig. 6), said shank adapted to fit neatly in any one of the perforations 38, and when inserted opposite the opening 17, and the disk 7, spun, will at the termination of the spinning cause the disk to oscillate about its vertical axial line and stop a short distance to either side of same, due to friction and to the force of gravity.

Adjacent to the above described apparatus is the playing field (see Fig. 1), which comprises a "gridiron" 21, spaced and divided by parallel lines in accordance with the rules of football, and having at one side numerals 22, indicating the number of yards from the goal lines to the center of the field. Arranged at the opposite side of the numerals 22, is a wire 23, and 10', slightly elevated above the board (see Figures 1 and 8), upon which is mounted a slidable ten yard line 24, capable of being moved along the length of said wire and is adapted to keep the yardage to be gained by the player having possession of the ball 25. The ten yard line represents the distance to be gained in four consecutive downs (spins of the disk) and is moved to its new position each time the ball has been advanced ten yards or more. The purpose of the ten yard line is to indicate to the players the number of yards that must be gained to make first down. A down is represented by one spin of the disk, that is each play is a down. The ball 25, is slidably attached to a wire 26, extending in the direction of the playing field, the two extremities of the wire are firmly attached to an endless cord 27. This cord passes over pulleys 28, beneath the table and carried over a system of small guide pulleys (not shown) in the form of a cross, in such a manner that the said ball may be freely moved along the length of said wire 26, and at right angles across the field 21, at the completion of each play. Goal posts 29, are placed at either end of the field. At each side of the playing field are colored portions 30, 31, and 32, representing three zones of play, in order that the results of the plays in a particular part of the field may more nearly approximate the actual results which might be expected from a certain play in a particular part of the field, graphically representing distances in a longitudinal direction on the playing field, zero to thirty yard line, thirty to twenty yard line and twenty to zero yard line in the direction of the advancing ball.

At suitable positions on the table are four dials 33, 34, 35, and 36, each of which is provided with a pointer 37, (see Fig. 1). The first mentioned dial 33, is for the purpose of keeping a record of the number of downs made by the offensive player, while in the possession of the ball 25. The second dial 34, is to keep the time of play, which is limited to a specified number of minutes and divided into four equal quarters or periods of time. The other two dials 35 and 36, are to keep the individual scores of the two players.

*To play.*—The game is played by two persons, one at either side of the disk 7, which is positioned at right angles to the players. The one player being designated as "offensive" and the other as "defensive".

Presupposing two evenly matched football teams in actual play, each team having a powerful "offense" and a good "defense";

the effectiveness of each however depending upon the knowledge of football that each player possesses and upon his resourcefulness. The position of the players in the various "formations" in the diagrams determine the degree of success attending the particular "offensive" play when it is completed. The player of the offensive team selects his play, (the different plays are printed on the rim of the disk), and determines the formation that he will use in making the play, by the position he assumes, (he being the eleventh player), in the diagrams of the two formations available in the play selected. This is done in the game by inserting the shank of the ball (see Fig. 6) in one of the perforations 38, and spinning the disk. The defensive player seeing this formation of the offensive team (through opening 17, in support 4), endeavors to diagnose the play, selecting the defense for the play which he believes the offensive team will make, and moves the pointer 16, to defense determined upon. The result of the play, (that is spin of the disk), the figure, symbol or letters showing loss or gain in yards, indicated by the pointer 15, on the offensive side of the disk 7, will depend upon how well the offensive player has arranged his team for the particular play, how well the defensive player has diagnosed the play, and upon that element of chance which enters into every game of football.

The ball 25 is moved at the completion of each spin of the disk to its new position, (as indicated by pointer 15), so many yards forward or backward on the playing field, and to the right or left so many yards, as the play is made on either side of the "scrimmage line." For example, a tackle-play carries the ball five yards to either right or left (of its former position) as the case may be, an end run fifteen yards, and a forward pass ten yards from the direction of the nearest side line. The forward end of the advancing ball 25, determines its position on the field of play. The zone on the right of the advancing ball 25 determines the zone in which the play is made, that is the colored zone spaces 30, 31, and 32, have correspondingly colored concentric bands on disk 7, in which bands are printed the results of the plays as made in each individual zone.

The choice of kicking or of receiving the initial kick-off is decided by the toss of a coin. This privilege (kicking or receiving) is reversed at the beginning of the third quarter. The kick-off is made by spinning the disk 7, without inserting the ball (see Fig. 6) in any of the perforations 38. (This leaves the result of the kick-off entirely a matter of chance.)

The time of a single game shall be optional with the players, but one hour, divided into four equal periods of fifteen minutes each is recommended. At the beginning of the second and fourth periods the players shall change goals, the possession of the ball, the down, the relative spot of the down and the distance to be gained, remain the same as at the termination of the preceding period. (That is, player A having possession of the ball on the opposing player's twelve yard line, it being third down and two yards to gain—shall when goals are changed (by players changing seats at playing table) player A shall again have possession of the ball on the opposing player's twelve yard line, it being third down and two yards to gain. The relative distance of the ball from the side lines shall be maintained also.)

*The scoring.*—The game shall be decided by the final score at the end of the four periods of play. The following is the value of plays in scoring: Touchdown, six points; successful try for point after touchdown, one point; goal from field, drop kick or placement kick, three points; safety by opponents, two points.

The side just scored upon shall have the option of kicking off or having the opponent kick off.

A kick off is the term used to designate the opening play of the first and third periods and it should consist of a place-kick from the forty yard line of the team entitled to kick.

A place-kick is made by kicking the ball from its position while it is resting on the ground.

After a goal from the field, and after a try-for-point following a touchdown, the ball must be put in play by a kick off.

A punt is made by dropping the ball from the hand or hands and kicking it before touches the ground.

A drop-kick is made by dropping the ball from the hand or hands and kicking it the instant it rises from the ground.

A try-for-point is the privilege granted the side which has made a touchdown and adds one additional point to its score by successfully executing a single play from scrimmage on the five yard line, i. e., kicking a goal by either drop kick or place-kick, carrying the ball across the opponent's goal line either by rushing or as a result of a completed forward pass.

A goal from the field is made by kicking the ball from the field of play either by a drop kick or a place kick over the cross bar of the opponent's goal. A goal cannot be scored by a kick off or a punt.

A touchdown is scored when the side in possession of the ball carries it over the opponent's goal line, either by a line play, end run or forward pass.

A touchback is declared when the ball passes over your own goal line provided the impetus which sent it across the line was given by an opponent. This may be due to a punt, a drop kick or a placement kick which failed to make a goal or an incomplete forward pass. Following a touchback, the ball is put in play on your twenty yard line, in your possession, first down and ten yards to go.

A safety is made when the ball is declared down behind your own goal line, provided the impetus which caused it to pass behind the goal line was given by the side defending the goal. Such impetus could come from a kick, pass, snapback or fumble by one of the players' own side.

The foregoing is a brief explanatory description of the terms used in the game of football.

In Figures 7, 8, 9, 10, of the drawings we have shown a modified form of our game apparatus differing from that previously described in none of the essential parts. The purpose of which is to provide a game that will be more simple and easily learned by beginners and still have all the principal plays which occur in the standard "rules and practice" governing football games.

It will be readily seen that these two separate apparatuses, shown and described, may readily be embraced in one. The disks may be added to, and may be substituted, the one for the other, in accord with the style of the game to be played. The game played with the apparatus described and shown in Figures 1 to 8 inclusive may be termed an "offensive and defensive game," to be used by experts, or those well skilled in the art of football. The apparatus shown in Figures 7, 8, 9, and 10, comprises a table such as previously described, including gridiron, goals, pointers, zones of play, ten yard line and numerous other features.

The disk 2' used in this apparatus differs from that of the others in that it is printed on both sides. The one (see Fig. 9) representing the various gains or losses due to the advance or retrograde movement of ball 15' over the field and the other side of said disk, Fig. 10, takes care of the various styles of kicking the ball, such as kick off, punt, etc. This disk 2', is divided into seven zones of play, which are indicated by radial lines 8' and concentric circles 5' into compartments 4' in each of which is printed a single individual play.

The pointer 8', for the disk is arranged in slides 7' and moves horizontally along one of the radial lines of said disk 2', and is equipped with two supplemental pointers 23' and 24', and register with the zones of play, indicated both on the field of play by letters A—B—C etc., and a schedule 26', at one side of the pointer 6'.

The ball 15' in this apparatus moves in a horizontal direction, i. e., the length of the field of play. The ten yard line 18', is the same as previously described. Time indicators 21' and 22', near the disk, are printed so that the one 22', may register the downs and the other 21' may keep a record of the number of quarters already played.

This disk 2', is spun upon an upright pivot 3' in a horizontal position, and may be lifted therefrom and turned to expose the other or reverse side.

Presupposing two evenly matched teams in actual play, each team having a good defense, and a powerful offense. The plays are so arranged upon the disk that it would be very dangerous to resort to the forward pass near your own goal line. Also, that after passing your opponent's forty yard line, it is more difficult to advance the ball. The zone on the right of the forward end of the advancing ball determines the zone of play.

*To play.*—Slide pointer 8', until indicator on side of pointer bar 6', is on the play desired, and in the division corresponding to the indicator letter (seen at 19', on both sides of the field of play) or color of zone in which play is made. Thus, in making an end run in zone B, slide the pointer 8', until indicator 24' points to division marked "end run" and subdivision corresponding to the zone in which play is made. Place disk 2' in position with S side up. Spin the disk. When disk stops the pointer 8', will indicate the result of play, and ball will be moved accordingly. All kicking plays are on the reverse side of the disk.

A down is counted with each spin of the disk. The team in possession of the ball is entitled to four (4) downs or four spins of the disk to advance the ball ten yards. If in four consecutive downs the team having constantly had the ball in its possession, and not having advanced the ball the required ten yards said ball shall go to the opponents on the spot of the fifth down. In case the ball has not been advanced the required ten yards on the fourth down, it is advisable to kick, punt or try for a field goal. The ball is then the opponent's unless fumbled by opponents or the field goal successful.

The forward point of the advancing ball 15' determines its position on the field of play, and said ball must be moved as each play or spin of the disk 2', is made.

First downs are recorded by indicator 18', on side lines of field, which measures ten yards, the required distance to be made in four consecutive downs. Each time the first down is made the indicator 18' is moved to the new position of first down as determined by the forward end of the ball 15'. The number of downs, 1st, 2nd, 3rd, and 4th, is recorded on the dial 21' located at one corner of the board. Time and periods are recorded on the dial 22', located at the opposite corner of the board.

When a fumble or blocked kick is made the player who first calls ball is given the ball on the spot where the fumble or blocked kick occurred.

A book of rules and full information as to how to play the game, will accompany each game board when placed upon the market.

It is obvious that numerous alterations and changes may be made in the details of construction and location of the parts without departing from the spirit of the invention, such as using colors to represent the different zones of play in place of letters or figures and parts of the apparatus may be abandoned without seriously interfering with the game.

Having thus described our invention, we claim:

1. In a game, a representation of a football field and a ball adapted to operate over a guide in four positive directions.

2. In a game, a representation of a football field, a ball adapted to operate over said field in four directions, means representing various plays of the offense and selective formations for said plays.

3. In a game, a representation of a football field, a ball adapted to operate over said field in four directions, means representing various plays of the offense, selective formations for said plays and selective means for defensive plays by the defense.

4. In a game, a representation of a football field, a ball adapted to operate over said field in four directions, means representing various plays of the offense, selective formations for said plays, selective means for defensive plays by the defense and a ten yard indicator adapted to be moved in the direction of the length of said football field.

5. In a game, a representation of a football field, a series of indicated zones of defense dividing said football field into zones of play.

6. In a game, a representation of a football field, a ball adapted to operate over said field in four directions, in combination with two separate movable members fundamentally related representing the offensive and defensive plays; a means for concealing the offensive play from the defensive player, indicators whereby said members are positioned by offensive and defensive players, the one member moving in relation to the other and indicating the result of the combined play of the offense and defense.

7. In a game, a representation of a football field, a ball adapted to operate over said field in four directions, a rotatable disc, means thereon representing zones of defense, the extent of rotation of which is controlled by the player.

8. In a game, a representation of a football field, a ball adapted to operate over a guide, said guide and ball capable of being moved over the football field.

9. In a game, a representation of a football field, a ball adapted to be moved over said field, and a guide carrying said ball in four positive directions.

10. In a game, a representation of a football field, a ball adapted to operate over said field, a guide capable of carrying said ball in the direction of the length and width of said field.

11. In a game, a representation of a football field, a ball adapted to operate over a guide in four positive directions, and a ten-yard indicator, capable of being moved in the direction of the length of said football field.

12. In a game, a representation of a football field, a ball adapted to operate over a guide in four positive directions, and a ten-yard indicator capable of being moved over a guide in the direction of the length of said football field.

13. In a game, a representation of a football field, a ball adapted to operate over said field in four directions, means representing various plays of the offensive and selective means for defensive plays by the defense.

14. In a game, a representation of a football field, a ball adapted to operate over the field, and a rotatable member, means thereon representing offensive plays, the extent of rotation of which is controlled by the player.

15. In a game, a representation of a football field, a ball adapted to operate over the field, a movable member, in combination with means representing defensive plays, the extent of movement of said member being controlled by the player.

16. In a game, a representation of a football field, a ball adapted to be moved over said field, in combination with a member having indicated thereon plays, a diagram of the formations for making such plays, and a means whereby the result of said plays is determined.

17. In a game, a representation of a football field, a ball adapted to operate over said field in four directions, in combination with two separate movable members fundamentally related, representing the offensive and defensive plays, the positioning of which determine the result of the play.

In testimony whereof, we have hereunto signed our names.

JOHN A. HARRISON.
GARVIN R. WYLIE.